Jan. 21, 1969  J. J. CELESIA  3,422,770
AUTOCOURSE RACEWAY SYSTEM
Filed Oct. 19, 1964  Sheet 1 of 7

Fig.1

JERRY J. CELESIA, INVENTOR

ATTORNEYS

Jan. 21, 1969　　　　　　J. J. CELESIA　　　　　　3,422,770
AUTOCOURSE RACEWAY SYSTEM
Filed Oct. 19, 1964　　　　　　　　　　　　　　Sheet 3 of 7

JERRY J. CELESIA, INVENTOR

ATTORNEYS

Jan. 21, 1969         J. J. CELESIA         3,422,770

AUTOCOURSE RACEWAY SYSTEM

Filed Oct. 19, 1964         Sheet 7 of 7

JERRY J. CELESIA, INVENTOR

ATTORNEYS

United States Patent Office 3,422,770
Patented Jan. 21, 1969

3,422,770
AUTOCOURSE RACEWAY SYSTEM
Jerry J. Celesia, Danville, Calif., assignor to San Roy Development Co., Inc., San Rafael, Calif., a corporation of California
Filed Oct. 19, 1964, Ser. No. 404,832
U.S. Cl. 104—149       7 Claims
Int. Cl. B61f 9/00; A63h 29/22; A63f 9/14

ABSTRACT OF THE DISCLOSURE

A slot car raceway system is provided wherein the track slots are provided with a plurality of electrically separated conductors and wherein such conductors are disposed at fixed distances below the track surface. Each slot car in use on the raceway is provided with individually selected flags which are designed to derive power from a preselected set of the electrical conductors disposed within the slots. By such means more than one slot car may be raced on any one slot on the raceway course, and further each individual car in each slot may be controlled independently of any other car.

---

The present invention relates to model vehicle raceway systems and more particularly to raceway systems for electrically driven model cars.

A relatively new recreational activity generally referred to as "slot-car" racing is becoming increasingly more popular in the United States and western Europe and has all the signs of becoming a permanent indoor activity along with bowling, archery, billards, etc.

A slot-car is a model sports-car which carries an electric motor for driving track-engaging wheels. The slot-car motor receives energizing current from conductors laid on the surface of a track. The motor drives the car which is guided by a flag which extends into a groove or slot in the track. A standard slot-car raceway track has a number of individual, separate racing slots (six being a common number) each of which has a source of electric potential associated therewith, the value of which is individually controllable by a rheostat. A race is conducted by a number of slot-car operators (drivers) placing their cars in different slots on a track and "driving" the cars around the track at speeds dependent upon the amount of voltage which each individual operator chooses to make available to his car at any one instant of time. The voltage source associated with each slot is electrically independent of the sources associated with the other slots, and thus the voltage made available to one car does not affect the voltage made available to any other car on the track. Since all tracks are designed to include curves of various degrees there is genuine skill involved in making available to a car the right amount of voltage to induce maximum speed but at the same time keep the car below the speed at which it spins out or leaves its slot.

Slot-car racing is generally conducted either on commercial tracks or table top tracks. Table top tracks are small tracks which can be purchased for home use and normally include fewer slots and are of less intricate design than the commercial tracks. Commercial tracks are operated as a business wherein drivers with their own cars who wish to race pay a certain fee for the use of a track slot, much the same as one pays for the use of a bowling alley lane. The commercial tracks are much larger (having hundreds of feet of track per lap) than the table top tracks and consequently attract the true "afficionado." The present invention, as will be made clear from the description which follows, is applicable to both table top tracks and commercial tracks.

The reason that slot car racing promises to be a permanent activity rather than a passing fad is the fact that a great deal of skill both on and off the track is required to produce a winning car. Much like actual racing cars, which slot-cars are designed to simulate, there are a number of variables which enter into the building of a car, including a choice of different size and type of tires, transmissions, motors, suspensions and weight distributions, all of which affect the operation of the car during racing. Secondly the car must be handled during competition in a skillful manner in order to attain top speed without losing control. Thus one is able to enjoy many of the thrills of sportscar racing without the attendant expense and danger which is a necessary part of actual sportscar racing. Further, slot-car racing is an activity which is not limited to persons of a particular sex or age.

The raceway systems used by virtually all commercial track operators employ DC electrical systems wherein each of the several voltage sources on a given track is individually controlled to provide a certain level of DC voltage potential to drive the DC motors with which virtually all slot-car racers are equipped. Since a driver can only regulate the current associated with one slot, it is mandatory that the racer which he drives remain in that slot at all times. Thus the number of cars which can race on any given track is limited to the number of separate slots. Since no two cars can operate on the same slot and still be individually controlled it follows that cars cannot change from one slot to another without the driver losing voltage control.

It has long been recognized that one of the main shortcomings of present slot-car tracks is the almost total independence of the cars from one another. Because of this independence the best car with the best driver invariably wins every race. Those familiar with actual sportscar racing are well aware that it is not always the best driver with the best car who wins but more often it is the good driver with a good car who is able to avoid the most number of unpredictable or unforeseeable events and mishaps such as mechanical failure, tire failure, accidents, slower cars, etc. These unforeseeable and generally uncontrollable events give sports car racing the great excitement which it has because at the beginning of each race all cars are potential winners.

Recognizing that it is desirable for slot-cars to be subjected to possible unforeseeable circumstances which arise from an interdependence between cars, there has been considerable effort by those active in the art to provide a raceway system wherein more than one car can effectively operate in a single slot. To date the only success has come with great expense which has prevented commercial success. These systems employ sources of power which are combinations of DC and AC voltage and require that a car be equipped with an AC motor, together with special transistors and diodes. The cost of racers able to operate on these tracks is as much as ten times greater than that of standard DC powered slot-cars, which cannot operate on AC systems. The present invention teaches a raceway system which is far superior to any system presently known by virtue of its ability to more accurately simulate the conditions of actual sportscar racing, and provide commercial track operators with up to six times as many feet of track per square foot of floor space as is now possible with known systems. In addition, the system of the present invention is fully compatible with racers now employed on standard DC slot-car tracks after a minor modification involving a cost of less than 1/10 of the original cost of the car and taking less than one minute to accomplish.

The present invention teaches a raceway system wherein each car is individually controlled by varying the amount of DC current (or voltage) made available to it and at the same time each car is capable of operation in any slot on the track without loss of individual control regardless of the number of other cars also operating in the same slot at the same time. Further the present invention teaches a raceway system wherein cars are automatically changed from one slot to another under certain conditions such that a driver is not sure at any time what slot he will be driving in on the next lap nor is he able to predict with accuracy whom he will have to share a slot with at any given time. This last-mentioned feature of the present invention gives rise to a definite interdependence between racers such that the best driver with the best car may well be forced to drive behind a slower car until such time as he can change slots. In this way he is subjected to potential losses of time somewhat out of his control. This of course is the feature which is being sought since it more accurately simulates actual sportscar racing than does total independence of the cars from each other.

In standard DC slot-car systems, each car is restricted to a single slot in any given race and thus a track is measured by the number of feet in a single lap. In the system taught by the present invention, any one car is capable of operating in any one of the slots (which need not be parallel to one another), and thus the number of racing feet to a track is equal to the number of slots times the number of feet in a single lap. This of course is of great economical significance to operators of commercial tracks since their cost of operation is greatly affected by the number of square feet of floor space required for a given number of feet of racing track.

The ability of one car to be controlled while operating in any track slot, coupled with the ability of a car to change from one slot to another, alleviates a problem which genuinely threatens the future success of slot-car racing and unquestionably removes this activity from being a mere fad. On a standard track where one car operates in one slot at all times and virtually no interdependence between cars exists, a driver familiar with the track can acquire the ability to rhythmically apply voltage potential to his racer so as to operate at maximum possible speed without leaving the track and will consistently beat those drivers who are not so familiar with the track and have not acquired this particular rhythm of voltage application. The effect of a driver acquiring this intimate knowledge of a track is two-fold. First of all it discourages other drivers who are less familiar with the track, and secondly it causes the driver who has acquired this knowledge of the track to lose interest and seek new tracks offering him more of a challenge. In order to alleviate this serious situation, many commercial track operators have found it necessary to change the design of their track at frequent intervals and within these intervals they run cars in different directions on different days for the purpose of providing variety and a challenging course.

Commercial track operators find it disadvantageous to change the design of the track often since it entails added expense and a necessary time period during which the track is not available for operation. The present invention makes it impossible for a person to acquire the ability to use a set rhythmic application of voltage to his racer to achieve the utmost possible speed, since a driver does not drive in the same slot for an extended period of time, and since drivers must be careful of slower cars in front of them at all times.

Besides the outstanding features mentioned above, the present invention teaches a raceway system which includes a lap counter designed to display the number of laps which each car has completed and which accurately operates even though the particular slot which any one car might be in when it passes the finish line cannot be accurately predicted.

Accordingly, it is an object of the present invention to provide a model raceway system which more accurately simulates actual sportscar racing than those systems presently known in the art.

Another object of the present invention is to provide a track for a model car raceway system wherein the track is designed to accommodate slot-car racers equipped with DC motors and wherein each slot is capable of receiving any car being raced at any time without any loss of individual driver control.

Still another object of the present invention is to provide a track for a raceway system for model cars which is equipped with a plurality of slots which are interconnected by lane-changers making it possible for a car to be transferred from one slot to another slot.

A further object of the present invention is to provide a new and novel flag for a slot-car racer which enables the car to be individually controlled regardless of the slot in which the car is operating when the racer is deployed on a raceway track as taught by the present invention.

Further objects of the present invention include a novel pulse generator for a lap counter, a new and novel lane-changing mechanism which establishes racing conditions which are beyond the control of the driver, and a raceway system capable of having a number of individually operated racers operating at the same time wherein the number of racers is greater than the number of slots in the raceway system track.

Further and more specific objects and advantages of the invention are made apparent in the following specification wherein a preferred form of the invention is described by reference to the accompanying drawings.

Figure 1:
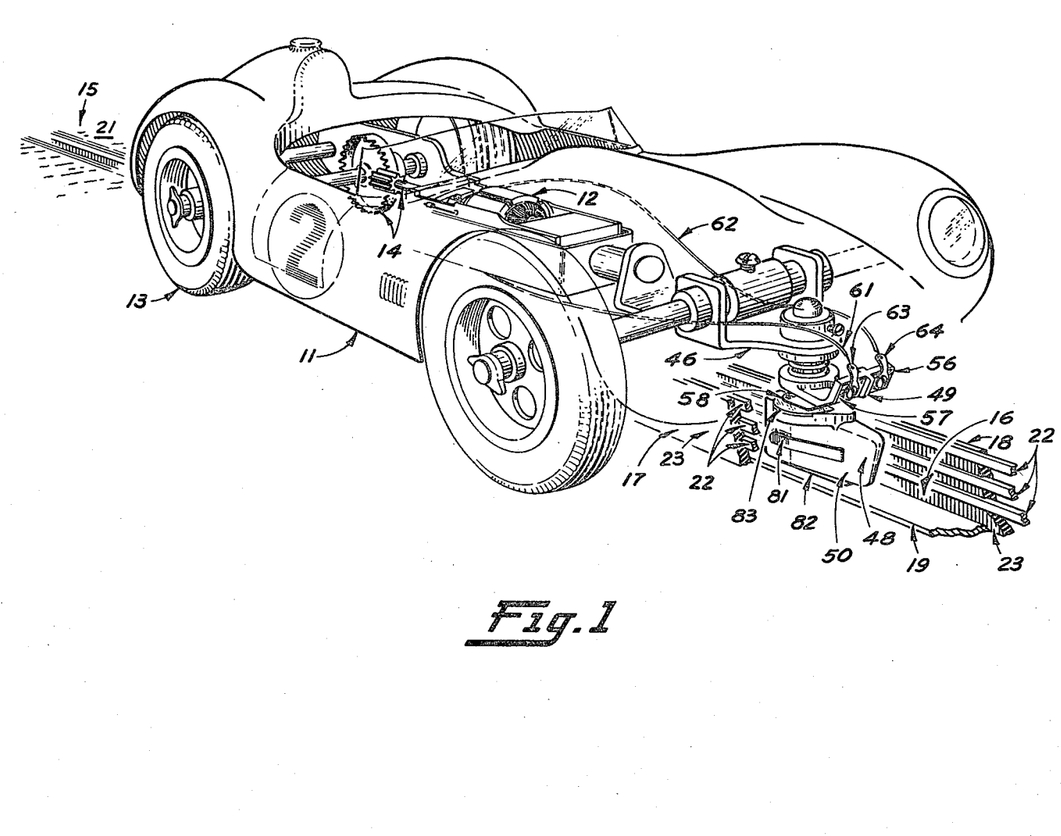
FIG. 1 is an isometric illustration of a slot-car racer with its flag shown operatively situated in a track slot.

Referring now to FIG. 1, a model racer 11 carries a DC electric motor 12 which operates to turn a pair of rear wheels 13 through intermediate gearing shown generally at 14. The electric motor 12 receives operating current from one of several sources of electric current disposed in a track slot 16.

Slot 16 represents any of the several racing slots found on the model car raceway track 15 and a description of the slot 16 serves as an accurate description of each of the several slots necessary to form a competitive track. Slot 16 comprises a first side wall 17, a second side wall 18 and a bottom 19 which extends between the two side walls 17 and 18 at some distance below the track surface 21. Affixed to the interior surface of each side wall is a plurality of electrical conductors 22 disposed parallel to the longitudinal axis of the slot and separated from one another by an insulation material 23. Bottom member 19 is formed from an electrically conductive material and is insulated from all of the conductors 22.

In the embodiment illustrated, each side of slot 16 contains three conductors. Each conductor is disposed at a particular distance below track surface 21 and remains at that relative position around the entire track. Thus there is a lower conductor, a middle conductor and an upper conductor associated with each side of slot 16 and these conductors line the entire length of each of the several track slots. Since, as mentioned above, each slot in a given track is identical with every other slot in that track, each of conductors 22 has an associated conductor in the other slots of the track. Racer 11 is illustrated as being driven from current drawn from the middle conductor on side 17, (as will be explained fully below). Since each slot has a side 17 and a middle conductor thereon, car 11 is able to draw driving current while in any slot. By adding five more racers each of which draws driving current from a different one of the five remaining conductors 22, it is seen that the present invention provides a track wherein six different cars are all associated with a different conductor and each slot of the track contains a separate conductor from which each car can draw driving current.

It should be noted that it is not necessary to have six separate slots even though there are six separate conductor circuits since it is altogether possible to have fewer racing slots than racing circuits due to the ability of the present invention to run more than one car on a slot.

Figure 7:
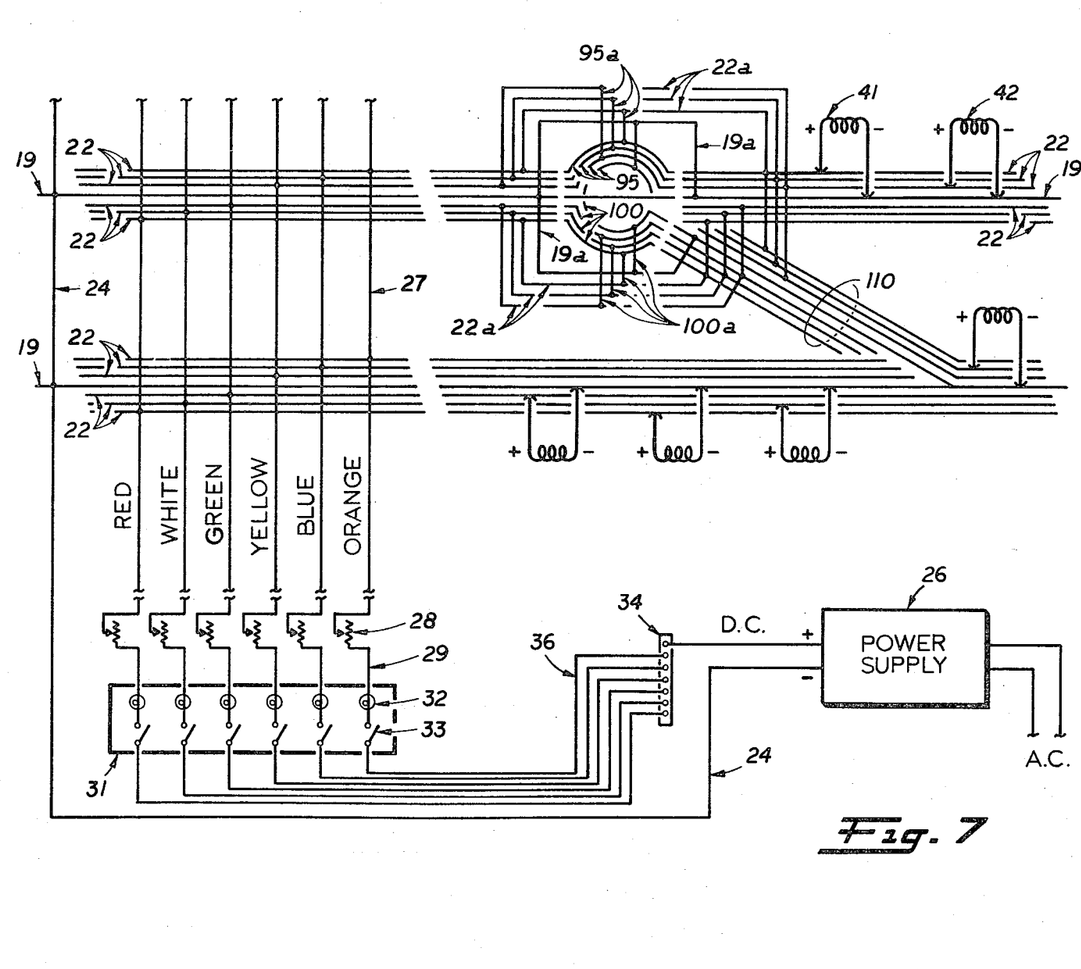
FIG. 7 is an electrical schematic illustration of the track electrical system which furnishes the cars with operating voltage.

Referring to FIG. 7, there is illustrated an electrical schematic diagram showing how the conductors 22 of the several separate slots are electrically associated and energized. The six circuit track illustrated is designed such that each slot (or lane) has six electrical conductors 22 disposed as illustrated in FIG. 1. Each lane further includes a single ground conductor 19. All of the ground conductors 19 are joined by a common ground line 24 which leads to the negative terminal of a DC power source 26.

Each of the conductors 22 is assigned a color code to clearly distinguish it from the other conductors and to make it clear which conductors in the several slots are associated with one another to form a single electrical racing circuit. In the particular embodiment illustrated, the upper conductor on slot side 18 (see FIG. 1) is color-coded orange, the middle conductor on slot side 18 is color-coded blue, the lower conductor on slot side 18 is color-coded yellow, the lower conductor on slot side 17 is color-coded green, the middle conductor white and the upper conductor red. All orange-coded conductors are electrically connected to conductor 27 (and thus they are electrically connected to each other) which connects to one side of a driving rheostat 28. The other side of rheostat 28 communicates through an electrical conductor 29 to a master control panel 31 which includes a light 32 and a power switch 33, in series. The power switch 33 is connected to a feeder terminal buss 34 by a conductor 36. The terminal buss 34 is connected to the positive terminal of power source 26 which provides a main source of electrical potential.

In the same manner that all orange-coded conductors are associated with one another and a control rheostat, so also are all blue-coded conductors associated with one another and a separate rheostat. And the same is true of the other color-coded conductors. Thus six separate electrical racing circuits are provided. If a car 41 (schematically illustrated) is designed to draw current from the orange coded conductor it will contact the upper conductor of side 18 and the common conductor 19. Assuming the power source 26 to be at some voltage such as 12 volts and the power switch 33 is closed, a complete circuit is formed from the power source 26 through the buss 34, conductor 36, switch 33, light 32, conductor 29, rheostat 28, conductor 27, conductor 22, racer 41, conductor 19, and conductor 24 back to the power source 26. The speed at which car 41 travels depends on the voltage drop between the conductor 22 and the conductor 19 which is in turn dependent upon the setting of rheostat 28. Thus the rheostat 28 acts as a control device to speed up or slow down a car as the driver considers necessary under the varying conditions. The conductor 27 which joins each of the orange-coded conductors makes it possible for car 41 to operate in any slot which contains a conductor which is part of the orange-coded circuit.

Also illustrated is a car 42, in the same slot as car 41. Car 42 is arranged to draw current from the yellow-coded conductor. Both of the cars are associated with the ground line 19 but each receives its positive potential from a different, independently controlled source. Thus the two racers illustrated in the same slot are independently controlled and fully capable of operating at different speeds.

Four cars are schematically illustrated on the same lane in FIG. 7 to clearly show that each lane is not limited to the number of cars which can be operated thereon, up to the total number of color-coded circuits.

Since each car being raced is capable of independently controlled operation on any lane, it is not necessary with the present invention, as it is with those systems known in the art, to restrict a car to one lane. Before explaining the lane-changing portion of the present invention, the portion of the invention provided to associate each car with a single racing circuit will be described.

Figure 2A:
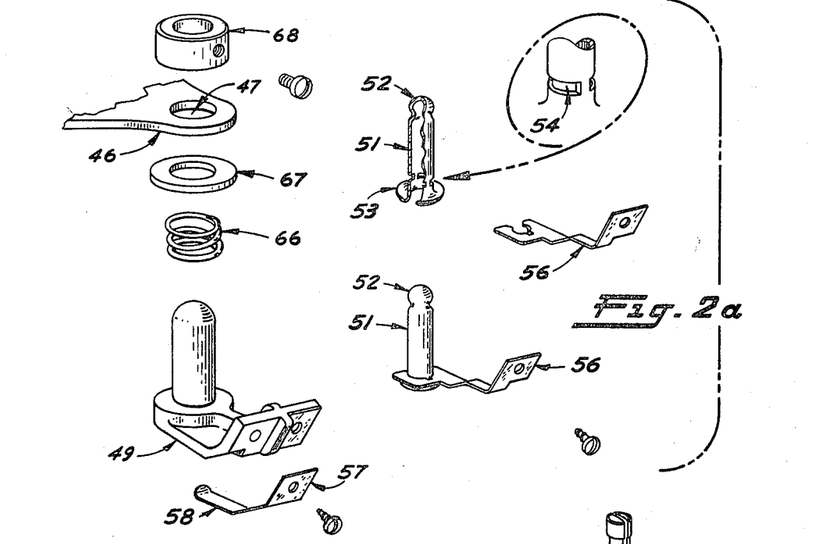
FIG. 2A is an isometric exploded assembly view of the terminal contact pickup assembly which replaces the conventional flag as a part of the model racer.
Figure 2B:
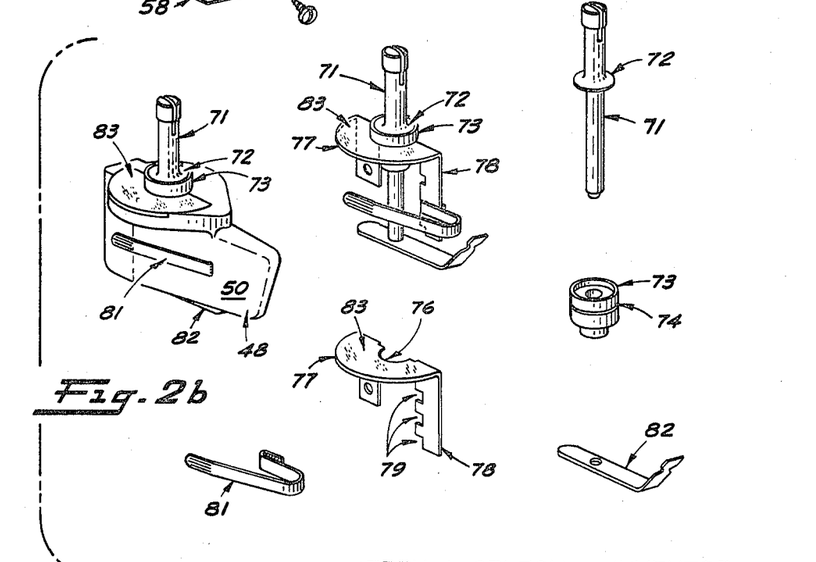
FIG. 2B is an isometric exploded assembly view of the lane guide contact assembly or, as it is more commonly called, the flag, of the present invention.

Referring now to FIGS. 1, 2A and 2B, the racer 11 includes a chassis 46 having a hole 47 in its forwardmost end. The chassis 46 is a standard part of virtually all slot-car racers designed to operate on DC tracks and normally supports a flag structure which is somewhat different than the flag assembly taught by the present invention. As previously mentioned, the only modification necessary to enjoy the advantages of the present invention is the substitution of the original flag and conductor assembly with a flag assembly as taught by the present invention.

The flag assembly of the present invention comprises a guide or flag portion 48 which is equally capable for forming a part of the car or a part of the track. The other part of the flag assembly is the terminal contact pickup 49 which is secured to the chassis 46 and becomes a fixed part of the model car 11.

The terminal contact pickup 49 includes a negative terminal post socket 51 which has a crowned top 52, a flared bottom 53, and a notched portion 54 located near the flared end 53. The terminal socket 51 is formed from an electrically conductive material and receives in its notched portion 54 a negative terminal contact member 56 which is supported by the socket 51. The terminal post socket 51 and terminal contact 56 are encapsulated in an insulating material to form the terminal contact pickup assembly 49 together with a positive terminal contact 57 which attaches to the insulation material. The positive terminal contact 57 includes a wiper portion 58 which is disposed at a distance from the body of the terminal contact pickup assembly when the positive terminal is secured to the insulator. As will be more fully described below, the wiper 58 acts as both an electrical contact and a spring. The motor 12 is electrically associated with the terminal contact pickup 49 through electrical conductors 61 and 62 and lugs 63 and 64, respectively. Lug 63 is secured to the positive terminal contact 57 while lug 64 is connected to the negative terminal contact 56.

When the assembly 49 is operatively disposed on a car, a compression spring 66 and a bearing washer 67 encircle the encapsulated terminal socket between the assembly base and chassis hole 57. A mounting collar 68 is secured to the encapsulated post socket to affix the terminal contact pickup 49 to the model car. The compression spring 66 urges the terminal contact pickup 49 downwardly away from chassis 56 causing collar 68 to be urged against the chassis with a given pressure. The spring mounting of assembly 49 to chassis 56 gives rise to a smoother riding car and a better electrical connection than results from a rigid mounting.

The lane guide contact assembly, or flag, 48 includes a negative terminal post 71 separated into an upper and lower portion by a flange 72. The flange 72 seats in the top of a cylindrical insulator member 73 which surrounds a portion of the lower part of post 71. In addition to acting as an insulator, member 73 acts as a means for locating the several components of the flag in a precise relationship to one another. The insulator 73 includes a circumferential groove 74 in its outer surface and is designed to receive the arcuate portion 76 of a positive contact buss 77. The buss 77 includes a generally vertically extending positive contactor supporting member 78 having three separate vertical notched positions 79 for receiving a positive contactor 81. After the positive contactor 81 has been secured at one of the three notched positions of member 78, a negative contactor 82 is secured at the very bottom of post 71, the entire assembly is partially encapsulated in an insulating material to form a guide 50.

The encapsulation of the various components which form the flag 48 is conducted in such a manner as to leave exposed the horizontally extending semi-circular upper portion 83 of the buss 77 as well as a portion of the negative contactor 82 and a portion of the positive contactor 81.

The flag 48 is associated with a car by inserting the upper portion of post 71 into the post socket 51 of the terminal contact pickup 49. The inside diameter of socket 51 is larger than the outside diameter of post 71 allowing the post to move freely in a vertical direction within the socket. The inner diameter of the bifurcated end of contactor 56, however, is somewhat less than the diameter of the split top of post 71 whereby the post must be "snapped" into the socket. Besides the mechanical connection formed, there is also an electrical connection formed between the upper portion of post 71 and the terminal socket 51. The mechanical connection between post 71 and socket 51 allows for relative angular movement between flag 48 and pickup 49 thus enabling car 11 to freely spin-out of driven too fast.

When a standard DC slot-car racer is modified to include the flag assembly as described above, it can be driven on a track having conductors in the slots and equipped with the novel electrical system previously described. FIG. 1 illustrates a flag 48 having a positive contactor 81 located to engage the middle conductor 22 on the side 17 of the slot 16. According to the color code system set forth above with reference to FIG. 7, this would be a white-coded flag designed to operate on the white-coded electrical circuit of the raceway system. Assuming an energized track, the positive contactor 81, which is bent away from the body of the flag 48 to contact the middle conductor 22, receives a positive potential which is transferred to the buss 77 and the semi-circular upper surface 83 thereof. In its operative position the wiper 58 of the positive terminal 57 engages the surface 83 of buss 77 and thus picks up the positive potential established thereon and transfers it to the lug 63 from which it is transmitted to the motor 12 by electrical conductor 61. A return path from motor 12 to ground is established through conductor 62, lug 64, negative terminal contact 56, negative terminal post socket 51, negative post 71, and negative contactor 82. Contactor 82 rides on the lower surface 19 of the slot 61 which as previously described is electrically connected to the negative side of the power supply which furnishes the electric potential. The complete electrical circuit formed, of which the motor 12 is a part, provides a source of electrical current for energizing the motor and thus driving the driven wheels 13 of the car 11.

By locating positive contactor 81 in one of the other notches 79, before encapsulation, a flag designed to associate a car with the green or red-coded racing circuit is formed. A buss designed to locate a positive contactor on the other side of the flag enables a car to be associated with one of the other three circuits.

The flag 48 serves not only as an electrical pickup but also as a guide for steering the model car through the slot 16. Where the slot 16 curves, the flag 48 turns relative to the pickup 49 and leads the car around the curve. Even though there is relative movement between flag 48 and pickup 49 whenever a curve in slot 16 is negotiated, there is no loss of electrical continuity as a result thereof. The semi-circular shape of surface 83 together with the spring action of wiper 58 which urges the wiper against surface 83 with a constant pressure insures good electrical contact between flag 48 and pickup 49 as long as car 11 is traveling within 90 degrees of the longitudinal axis of the track slot (in a forward direction). If the car should spin and come to rest facing in the wrong direction, the wiper 58 will leave the surface 83 and electrical communication between conductor 22 and motor 12 will be interrupted removing the driving power from the car. This is an important feature of the present invention since it prevents a car from accidentally being driven in the wrong direction. In view of the fact that the track of the present invention is designed to have more than a single car operated on a given slot it is necessary to prevent a car from accidentally traveling in the wrong direction if serious damage to the models is to be prevented. Since it is not common in actual auto racing to find a car traveling in the wrong direction, there is no need to allow such travel in slot-car systems.

The ability of each car to operate in six different slots introduce a genuine interrelationship between cars which simulates actual conditions on a sports car track more accurately than prior art systems, and thus greatly enhances the challenge of model car racing. Before the full advantages of this system is realized, however, means for changing cars from one slot to another must be provided.

Figure 3:
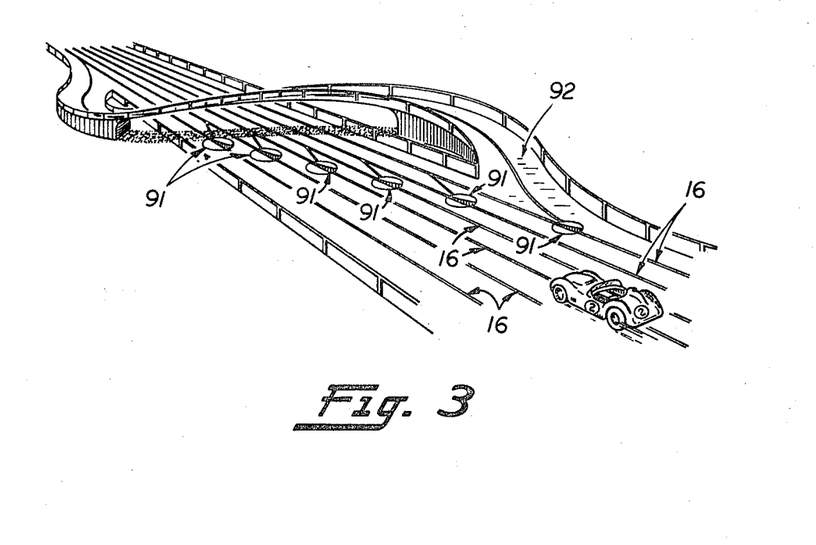
FIG. 3 is an isometric illustration of a section of track containing lane changers and an overpass.

FIG. 3 illustrates a portion of track 21 having six slots 16 each of which includes a lane-changer 91. Each lane-changer 91 has two operating positions; one permits a model racer to pass through the lane-changer and remain in the same slot, the second results in a model racer being transferred to an adjacent slot. In order to make it possible to change out of all of the lanes, it is necessary for the lane furthest to the right to have an overpass (or underpass) 92 which enables a car to be transferred from the lane furthest to the right to the lane furthest to the left. Thus, each time a racer passes through a lane-changer, it is subjected to the possibility of changing from one slot to the adjacent slot to the right and in this way may be required to negotiate a different, unfamiliar course (which is possible with the present invention since it is not necessary for all lanes to be parallel to one another at all times). The control of the lane-changers is subject to a great variety of possibilities including automatic lane-changing as well as lane-changing under the control of the driver. The present invention teaches a particular embodiment wherein the driver of the car has no control over the lane-changers.

The following description of the lane changers of the present invention will be made with reference to FIGS. 3–7. Each of the generally rectangular slots 16 includes at least one discontinuity in the form of a cylindrical mounting socket 94 wherein the diameter of the socket is several times greater than the width of the slot and the center line of the slot lies along a diameter of the socket. Rotatably disposed within the socket 94 is a generally cylindrical-shaped gate disc 96 which is secured to a rotary solenoid 97 which is disposed beneath the track 15 and secured in place by a bracket 98.

Figure 4:
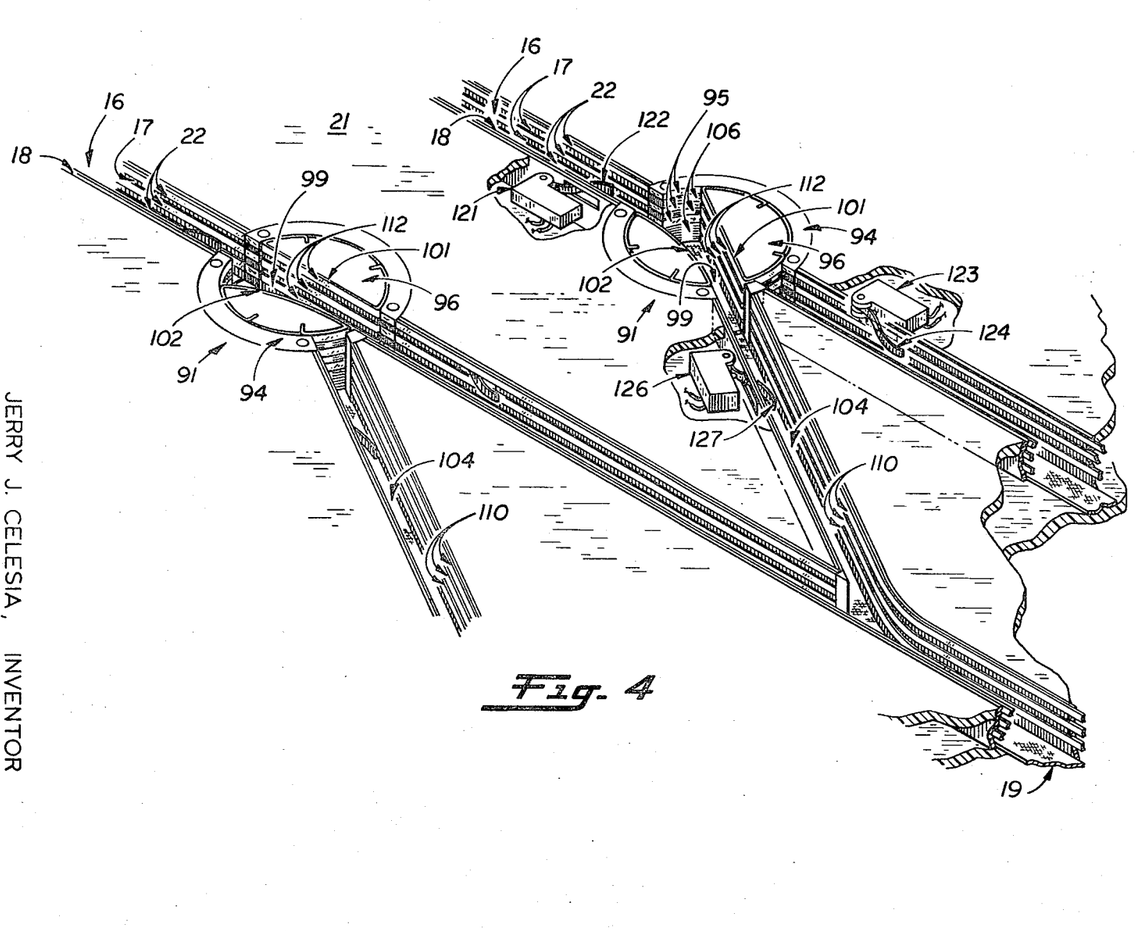
FIG. 4 is an isometric illustration of two adjacent track slots with lane-changers wherein one lane-changer is shown in its "lane-change" position while the other is in its "normal" position.
Figure 5:
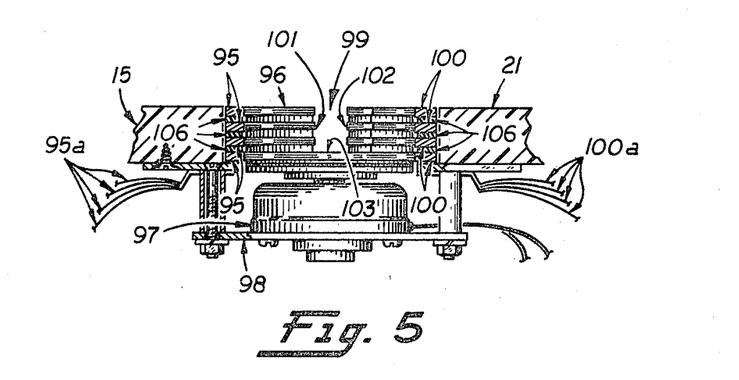
FIG. 5 is a side view of a lane-changer showing its relationship to the track.

The gate 96 has a diametrically disposed slot 99 defined by a substantially straight side wall 101, an opposing curved side wall 102, and a bottom 103 which connects walls 101 and 102 at the same distance below the track surface 21 as the slot bottom 19 connects the side 17 to side 18. Each lane-changer 91 includes a transfer slot 104 which extends between the socket 94 associated with one slot and the adjacent slot. The transfer slot 104 is substantially identical to slot 16 in size and construction.

When the gate 96 is positioned such that the straight side 101 of gate slot 99 is aligned with the slot wall 18, the gate slot 99 guides the flag 48 of a car traveling on track 15 straight through the lane-changer without the car changing lanes. When the gate 96 is positioned such that the side 101 is parallel to the transfer slot 104, the flag 48 of the car traveling in slot 16 is guided from slot 16 to the transfer slot 104 from which it enters an adjacent slot 16 on which it continues its operation. Thus by controlling the position of gate 96 it is possible to have cars change lanes and operate on different lanes at different times.

It is not altogether necessary for proper operation of the present invention to provide a source of electrical potential to a model car as it passes through a gate disc 96 since the momentum of the car will almost always be sufficient to carry it through the disc without the aid of driving current. Providing energizing current to a car while it is in the gate 96, however, is possible in the present invention by the addition of a simple circuit, and a special socket 94.

A socket 94 designed to furnish driving power to cars passing therethrough is formed from two sets of semicircular discs, 95 and 100 disposed between semi-circular insulators 106. Each disc 95 is connected to a separate lead wire 95a while discs 100 have associated lead wires 100a. These lead wires connect to the source of voltage, as will be explained.

As best seen in FIG. 7, the conductors 22 of a slot 16 suffer an electrical discontinuity as well as a mechanical discontinuity as a result of a lane-changer socket 94. In order to preserve electrical continuity between corresponding conductors 22, jumpers 22a and 19a are provided around the socket. The conductors 95a from discs 95 are electrically joined to corresponding conductors 22a; conductors 100a from discs 100 are also joined to their corresponding conductors 22a, whereby the socket receives voltage from source 26. Conductors 110 in transfer slot 104 are also electrically associated with conductors 22 by conductors 22a.

The disc 96 which is disposed in socket 94 is constructed to transfer voltage from socket 94 to a flag 48 in slot 99. Walls 101 and 102 which define the gate slot 99 are lined with conductors 112, which are similar to conductors 22 and at the same distances below the track surface 21. The conductors 112 extend around to the exterior cylindrical surface of the gate disc 96 but do not necessarily completely encircle the gate.

The conductors 112 which line side 101 of gate disc 96 contact discs 95 of socket 94, and thus have an electrical potential established thereon. Electrical contact is established between the conductors 112 on side 101 and discs 95 in both the no-change and change positions of the gate 96. The conductors 112 on side 102 of gate 96 have an electrical potential establisher thereon by virtue of their contact with discs 100. Once again the electrical continuity necessary to establish an electrical potential on the conductors 112 on side 102 is established in both positions of the gate 96.

As previously mentioned, the particular manner of controlling the position of gate disc 96 is subject to a variety of possibilities. In the present invention a control system for the lane-changer operates automatically and is not under the control of the drivers.

FIG. 4 illustrates a switch 121 located adjacent slot 16 at the up-track side of the socket 94 near the juncture between the socket 94 and the racing slot 16. An actuator 122 associated with the switch 121 extends into the slot 16 and is activated each time a flag 48 passes through the slot at that location. A second switch 123 is located adjacent racing slot 16 on the down-track side of socket 94 near the juncture of slot 16 and socket 94, and has an actuator 124 which extends into the slot 16 for actuation by a passing flag. A third switch 126 is located adjacent to the transfer slot 104 and has an actuator 127 which extends into slot 124.

The solenoid 97 which controls the angular position of guide 96 has a normal position which it assumes when the solenoid coil is not energized. The normal position of solenoid 97 positions gate 96 so as to align slot 99 with slot 16. When a car approaches the lane-changer and its flag activates switch 121, the position of gate 96 may change or it may remain in its normal position. If the actuation of switch 121 does not change the position of gate 96, the flag will actuate switch 123 as it leaves the lane-changer. Actuation of switch 123 energizes a circuit to switch 121 as a first step to changing the position of gate disc 96. If the circuit which switch 123 energizes is energized when a flag approaches the lane-changer and actuates switch 121, then gate 96 rotates until slot 99 forms a path between slots 16 and transfer slot 104, which results in the car changing lanes.

As a car passes through the transfer slot 104, it actuates normally closed switch 126 which causes the gate 96 to return to its normal position and also operates to de-energize the circuit energized by actuation of switch 123. Thus, the lane-changer will alternately pass cars straight through and cause them to change lanes. The normal position of the gate 96 is the same regardless of whether or not the necessary circuits are energized to enable the gate 96 to rotate to its lane change position in response to switch 121 being actuated. Therefore, it is only possible to know what effect the lane-changer will have on a car by knowing how it operated on the last car to pass through it. It is very difficult for a driver of a slot-car to divert his attention from his racer to other parts of the track to keep an accurate account of the operation of the lane-changers and thus finds it difficult to know in advance how a lane-changer which he must negotiate will operate on his car.

Figure 6:
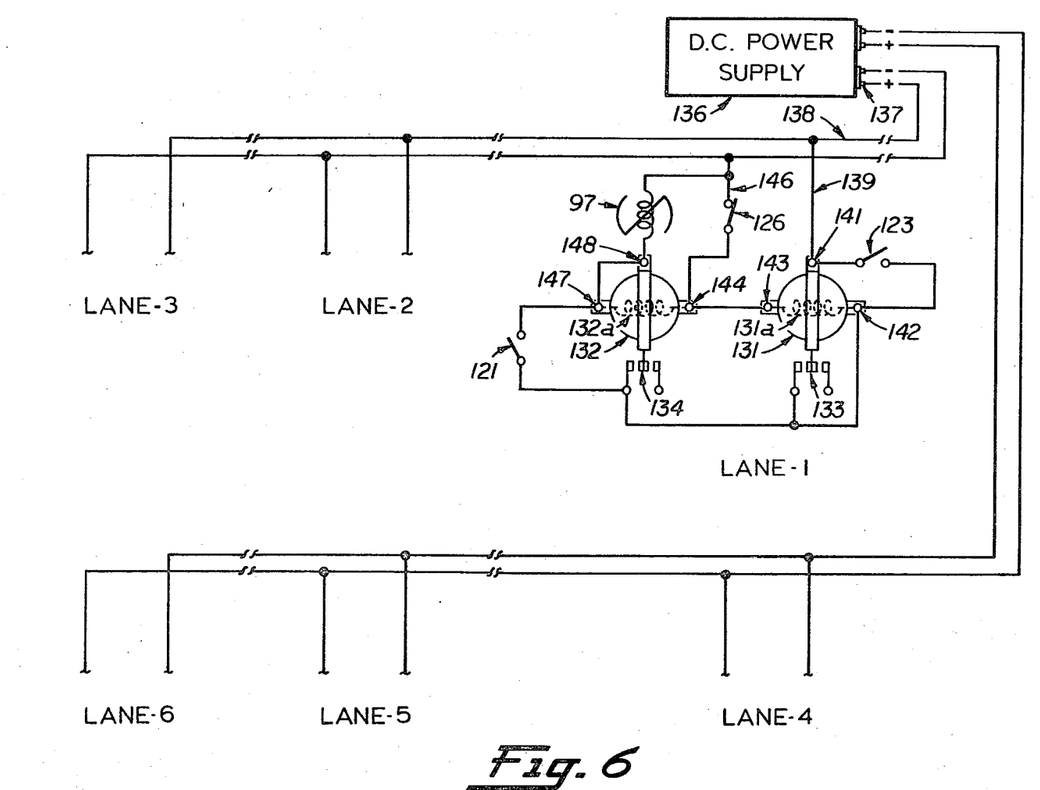
FIG. 6 is an electrical schematic illustration of the lane-changer control circuitry.

The electrical circuit which associates switches 121, 123, and 126 with solenoid 97 is illustrated in FIG. 6. There are six identical circuits illustrated, one for each lane-changer. Accordingly, the following description of the electrical circuit associated with one lane-changer will serve as an accurate description of all of the lane-changer circuits.

Each lane-changer circuit includes switches 121 and 123 which are normally open, switch 126 which is normally closed, rotary solenoid 97 and a pair of relays 131 and 132 which have normally open relay contacts 133 and 134, respectively, associated therewith. A power supply 136 has a positive potential terminal 137 which is electrically connected via conductors 138 and 139 to a relay terminal 141 which is electrically connected to both switch 123 and contacts 133. Relay 131 has a coil 131a one end of which is connected to a coil terminal 142 which is electrically connected to switch 123 and contacts 133 but separated from the terminal 141 by switch 123 and contacts 133. The other end of coil 131a is connected to terminal 143 which is in turn electrically connected to a terminal 144 which is connected to one end of terminal coil 132a of relay 132. The terminal 144 is electrically connected to the negative terminal of power supply 136 by conductor 146 which includes, in series, the normally closed switch 126.

Contacts 133 are electrically connected to normally open contacts 134, which are in turn electrically connected to one side of switch 121. The other side of switch 121 is connected to a coil terminal 147 which is affixed to one end of coil 132a of relay 132. Terminal 147 is electrically connected to terminal 148 which electrically communicates with contacts 134 as well as with the lane-changer rotary solenoid 97. The other side of solenoid 97 is electrically connected to conductor 146 which leads to the negative terminal of power supply 136.

When both relay coils are de-energized and all switches are in their normal positions, the circuit will be unaffected by the momentary closing of switch 121 when the flag of a slot-car racer initially enters the lane-changer. The positive source of potential is isolated from switch 121 by open switch 123 and open contacts 133. Since the closing of switch 121 has no affect on the solenoid 97, the position of gate 96 remains unchanged from its normal position. Thus, the racer continues to operate in the same slot and passes out of the changer after actuating switch 123.

Actuation of switch 123 which causes a momentary closing thereof, allows the positive potential on terminal 141 to drop across the relay coil, and completes a circuit for current to flow through the relay coil. Current flowing through the coil of relay 131 causes the normally open contacts 133 to close thereby establishing a current path from terminal 141 through contacts 133, to terminal 142, through the coil of relay 131 to terminal 143, and out terminal 143 to the ground return path including terminal 144, conductor 146 and normally closed switch 126. Thus, the momentary closing of switch 123 sets up a more permanent current path through contacts 133 such that the re-opening of switch 123 as the flag passes out of the lane-changer does not result in the de-energization of the coil 131a. Thus, the first car to pass through the lane-changer operates only to activate a portion of the lane-changer circuit in a manner which enables the next car passing through that changer to operate solenoid 97 by actuating switch 121.

When coil 131a is energized, a car approaching the lane-changer and closing switch 121 forms a momentary complete circuit from contacts 133 through the coil 132a and back to the negative side of the power supply through switch 126. The energization of the coil 132a operates to close the normally open contacts 134 which results in a more permanent current path from contacts 133 through contacts 134, terminal 148, terminal 147, and out terminal 144. A current path is also formed from terminal 143 through rotary solenoid 97 to ground return conductor 146. Thus, the momentary closing of switch 121 when the circuit is in its energized condition results in solenoid 97 becoming energized and the gate 96 changing from its normal, straight-through, no change position to its lane-change position. The car closing the switch 121 is thus transferred to the transfer slot 104 and from there to the adjacent slot 16.

As the car passes through the transfer slot 104, it actuates the normally closed switch 126 causing that switch to momentarily open. When the switch 126 opens all complete circuits between the positive and negative terminals of the power supply are momentarily opened and both relays 131 and 132 are thereby de-energized. With the relays de-energized the contacts 133 and 134 open breaking the current path through solenoid 97. The solenoid reacts to the interruption of energizing current by returning the gate to its normal position. As soon as the car passes the switch 126 the switch returns to its closed position and the circuit is once again in its normal, deenergized condition ready for the next car to pass through the lane-changer and energize the coil 131a.

The lane-changer circuitry described above associates the various components of the lane-changer to produce a sequence of operations which is advantageous for several reasons. Alternative modes of operation are possible and have their own advantages. Such alternatives include a control switch between the rotary solenoid and a source of energizing current with each driver able to activate the control switch when he desires to change lanes. Other arrangements producing the same results as the circuit described could employ a flip-flop circuit and a single switch disposed at the location of switch 121. This circuit would have a built-in time delay designed to enable a car to pass through the lane-changer before it automatically returned the changer to its normal position. The flip-flop would operate to energize the solenoid only when the circuit flopped thus giving the alternating operation achieved by the circuit described above. A scrambling circuit could be employed to make it completely impossible to predict the operation of the lane-changer and thus prevent even those drivers capable of keeping track of the history of operation of the lane-changer from predicting what it will do the next time a car enters it.

The particular three switch arrangement disclosed and illustrated has particular advantages, however, some or all of which are lacking in each of the alternative arrangements suggested. The three switch arrangement enables a string of cars, one immediately behind the other, to pass through the lane-changer wherein alternate cars pass straight through and the other cars are diverted to the transfer slot. In order to achieve this result, it is necessary that the first car approaching the changer quickly operate the solenoid and then release it before the subsequent car passes switch 121. Taking into account the length of the cars, the distance between switches 121 and 126 can be accurately calculated to insure that the solenoid will always be in its normal position when the switch 121 is tripped by a slot-car racer's flag. At the same time, it is impossible for the solenoid to be returned to its normal position, once it has been rotated to its lane-change position, while a flag is still in the gate 96. These two features are most important for successful operation of a lane-changer and make the particular arrangement disclosed significantly advantageous.

With cars changing lanes, spin-out, de-slotting and otherwise experiencing the difficulties involved in completing a race of several laps or more it is extremely difficult to know how many laps each car has completed and therefore who is winning. More importantly, it is often difficult to know who has won. As a solution to this problem the present invention teaches a novel lap counting system which automatically maintains an acurate count of the number of laps completed by each car in the race. In order to operate with a track as taught by the present invention, it is necessary for a lap counter system to count a lap completed by a car, regardless of which of the several racing slots the car operated in during that particular lap.

Figure 8:
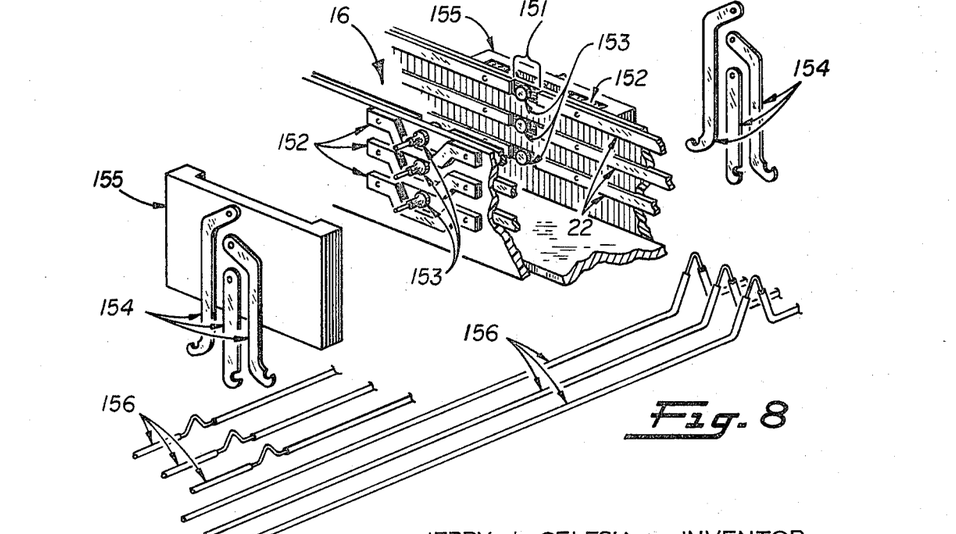
FIG. 8 is an isometric illustration of a section of track containing pulse generators for operating associated lap counters which are also illustrated.
Figure 9:
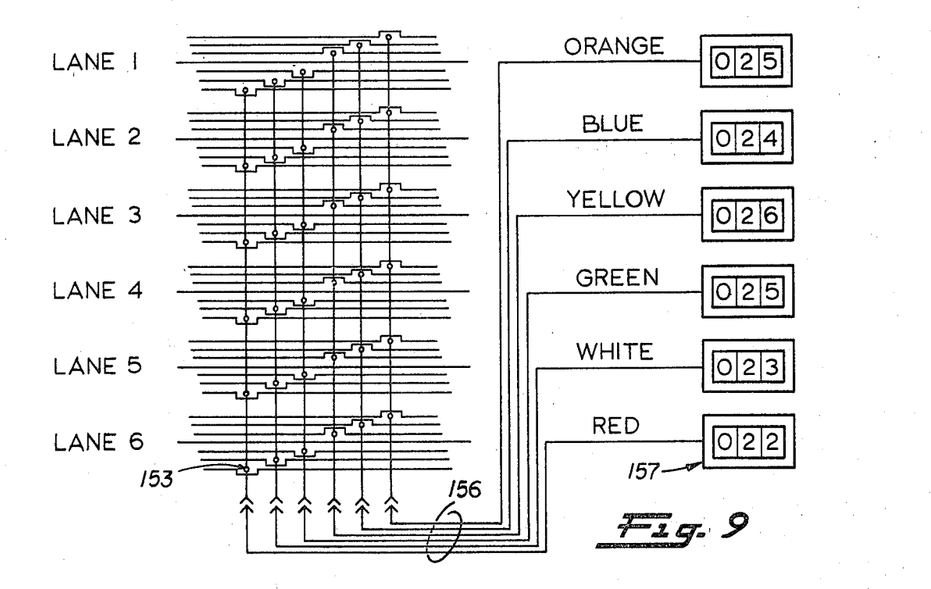
FIG. 9 is an electrical schematic illustration of the lap counter of the invention.

Referring now to FIGS. 8 and 9, a section of track 16 contains conductors 22, each of which has a gap or discontinuity 151. The discontinuity is only mechanical by virtue of U-shaped jumpers 152 which maintain electrical continuity. Disposed in each gap 151 is an electrically conductive pulser terminal 153 which is in the same plane as the conductor with which it is associated but spaced therefrom by the gap 151. Each conductor 22 in each slot 16 has a gap 151 and associated terminal 153 (thus making a total of thirty-six for the particular six slot, six circuit track described) with all gaps preferably being located at one transverse location designated as the "finish line."

Each pulser terminal 153 has an associated electrical connector 154 mounted on insulator 155. All conductors 156 connected to pulser terminals 153 which are associated with a single electrical racing circuit are electrically joined and connected to a counter mechanism 157 which is of standard construction and known in the art. Since each of the six separate racing circuits have one conductor 22 in each slot, each counter 157 will be electrically joined to a terminal 153 in each slot.

As a car completes a lap and crosses the finish line, its flag 48 passes a terminal 153 and the contactor 81 momentarily forms a short circuit between conductor 22 and terminal 153. Since conductor 22 is at a positive voltage, terminal 153 will be momentarily raised to a positive potential and a counter 157 will experience a voltage pulse. Counters 157 are of the type which respond to a voltage pulse by registering a digit which corresponds to the number of pulses received as of a given starting period.

Each car is associated with a single racing circuit as previously described. All of the pulser terminals 153 associated with one racing circuit are connected to the same counter. Each slot contains one pulser associated with each racing circuit. Thus, only one car can direct a pulse to a given counter, and it directs a pulse to that counter each time it passes the finish line, regardless of which slot it is in when it passes the finish line.

The particular pulse generators (pulser terminals 153) described are advantageous due to their extreme simplicity and absence of moving parts. More conventional switch mechanisms can also be employed as can pressure sensitive devices, light systems, etc., and still practice the invention.

From the foregoing description it is apparent that the present invention teaches an entirely new raceway system for electrically driven model cars. The current carrying conductors are disposed within the slots instead of on the track surface, and the car flags serve as both guides and electrical pickups. By associating multiple racing circuits with each slot, cars can operate equally well in all slots and still be controlled from a single control rheostat. This makes genuine lane changing possible, and thus provides for more exciting racing which features real interdependence between cars. To add further to the spectator attraction, lap counters are provided as an integral part of the track.

One of the most outstanding features of the present invention is the fact that it does not make the millions of DC racers now in existence obsolete. The DC racers which are raced all over the country today, and which represent a sizable investment on the part of the slot-car enthusiast, are the very cars for which the present invention is designed. Thus, the long sought for interdependence which comes only with more than one car operating in a single slot is achieved by the present invention without requiring a major change in DC racers now being raced. The present invention stands alone in this achievement.

The break-through made by the present invention is attributable largely to several basic concepts which are not limited to the particular embodiments illustrated. While multiple racing circuits are most advantageously exposed within the slots, they can be exposed on the track surface. Similarly, the contactors for engaging the circuit conductors do not have to be part of the flag, even though many advantages are realized when they are. The lane-changers can be constructed to guide a car leftwardly as well as rightwardly and thus provide three possible paths out of each lane-changer instead of only two. Tracks can be constructed to have more racing circuits than slots whereby the number of cars raced is greater than the number of slots. Such a track would always have one slot with more than one car being raced on it, when all circuits were being used.

I claim:

1. A model car raceway system comprising in combination;
    a track having a plurality of racing slots therein, wherein said slots are formed by generally vertical, spaced-apart, side wall members which extend below the upper surface of the track;
    a plurality of electrically separated conductors disposed on at least one side wall member of each slot and each separate conductor in each slot is at a particular distance below the surface of the track;
    a source of electrical potential associated with said conductors for establishing an electrical potential thereon and all conductors at the same distance below the surface of the track and on corresponding side walls are electrically joined; and
    control means operable to individlally control the potential on said conductors.

2. The raceway system of claim 1 further comprising a slot bottom member between the two side wall members, said bottom member including an electrical ground conductor.

3. A model car raceway system comprising in combination;
    a flat surfaced track having a plurality of racing slots therein, said slots formed by a pair of opposing, spaced-apart side wall members which extend below the surface of the track, and a bottom member joining the two side wall members at a location below the surface of the track;
    a plurality of electrical conductors disposed in each of said slots on said side wall members, said conductors parallel to the longitudinal axis of said slots and electrically separated from one another, each slot having the same preselected locations below the track surface for said conductors whereby each slot contains a plurality of conductors to which there are counterparts in every other slot;
    means electrically connecting the several conductors all disposed at corresponding locations within the several slots to form several electrical racing circuits;
    a ground conductor disposed along said bottom member of each slot;
    an electrical potential source; and
    electrical potential control means individually associating each of the several electrical racing circuits with said source of potential whereby the potential at each circuit can be individually controlled.

4. A flag assembly for use with an electrically powered model racing car designed to operate on a track having slots, comprising in combination;
    a guide member designed to fit into track slots;
    a first electrical contactor affixed to said guide member for engaging a ground conductor; and
    a second electrical contactor affixed to said guide member for engaging a voltage conductor, said second contactor affixed in any one of a number of preselected, different, specified locations on said guide member.

5. The flag assembly of claim 4 wherein said first contactor is located at the bottom of said guide member and the preselected different locations for said second contactor are all on the sides of said guide member.

6. A flag assembly for an electrically powered model racing car comprising in combination;
    a generally vertically oriented electrically conductive post;
    a post socket of electrically conductive material affixed to the model car and designed to receive said post to form a releasable, rotatable, connection therewith as well as to electrically communicate therewith;
    a ground pick-up contactor affixed to said post and electrically connected thereto;
    an electrical buss affixed to said post and electrically insulated therefrom, said buss further having a generally vertically oriented portion and a generally semi-circular horizontally oriented portion and several preselected locations on the vertical portion thereof shaped for affixing a voltage contactor thereto;
    a voltage contactor affixed to said buss at one of said several preselected locations on the vertical portion thereof and electrically connected thereto;
    a voltage contactor pick-up connected to said post socket but electrically insulated therefrom, said pick-up operable to electrically connect said semi-circular horizontally oriented portion of said buss when said post is inserted into said socket;
    and an electrically nonconductive material partly encapsulating said ground contactor, said voltage contactor, said post, and said buss to form a guide and leaving at least a portion of said ground contactor, said voltage contactor, said post, and said buss exposed where the portion of the buss exposed is the semi-circular portion thereof, and further wherein said voltage pick-up member is separated from said semi-circular portion of said buss when said guide rotates relative to said encapsulated post socket more than 90 degrees from a preset relative position.

7. A model car raceway system comprising in combination:
- a track having a plurality of racing slots therein;
- at least one transfer slot interconnecting each of said racing slots;
- a plurality of electrically separate electrically conductive members associated with each slot;
- each of said conductive members being disposed within said slot and each of said conductive members in each slot having a corresponding conductive member in every other slot and further electrically conductive means joining all corresponding conductive members to form several electrical racing circuits;
- a source of electrical potential associated with said members for establishing an electrical potential on said members;
- manually operable means to individually control the magnitude of the electrical potential established on said conductive members;
- a plurality of flags designed to ride in said slots;
- each of said flags carried by and electrically connected to a model car;
- electrical contactors carried by said flags for engaging one pair of conductors in each of said racing slots wherein the conductors engaged by the contactors of one flag form one electrical racing circuit;
- each of said flags further comprising a generally vertically oriented post which extends above the surface of the track, said post connected to and in electrical communication with one of said contactors, said post connected to but electrically separated from the other of said contactors; and
- an electrical buss connected to but insulated from said post, said buss connecting said other contactor to said post, said buss including an exposed generally semicircular, horizontally extending, flat portion located near the mid-section of said post.

References Cited

UNITED STATES PATENTS

| | | | |
|---|---|---|---|
| 2,899,910 | 8/1959 | Vivari | 104—150 |
| 3,117,755 | 1/1964 | Kretzmer | 246—415 |
| 3,205,833 | 9/1965 | Fitzpatrick | 104—60 |
| 3,206,122 | 9/1965 | Frisbie et al. | 104—60 X |
| 1,657,511 | 1/1928 | Lorenz et al. | 104—60 |
| 1,750,322 | 3/1930 | Koerber | 246—255 X |
| 2,068,403 | 1/1937 | Ekstrom. | |
| 2,079,251 | 5/1937 | Haupt. | |
| 2,631,853 | 3/1953 | Hayes et al. | 273—86 |
| 2,685,003 | 7/1954 | Barnes et al. | 104—247 X |
| 2,687,304 | 8/1954 | Northrop et al. | 104—60 X |
| 3,143,976 | 8/1964 | Wherry | 246—415 X |
| 3,201,899 | 8/1965 | Toteff et al. | |
| 3,219,816 | 11/1965 | Albertson et al. | 246—255 |

FOREIGN PATENTS

| | | |
|---|---|---|
| 297,449 | 6/1954 | Switzerland. |
| 465,168 | 4/1937 | Great Britain. |
| 469,656 | 7/1937 | Great Britain. |
| 894,837 | 4/1962 | Great Britain. |

DRAYTON E. HOFFMAN, *Primary Examiner.*

U.S. Cl. X.R.

46—243; 104—60, 247; 238—10; 246—415; 273—86